United States Patent
Tateishi

(10) Patent No.: US 10,471,911 B2
(45) Date of Patent: Nov. 12, 2019

(54) POWER SUPPLY CONTROL APPARATUS, COMMUNICATION SYSTEM, AND POWER SUPPLY CONTROL METHOD

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Hiroshi Tateishi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/759,296

(22) PCT Filed: Sep. 8, 2016

(86) PCT No.: PCT/JP2016/076360
§ 371 (c)(1),
(2) Date: Mar. 12, 2018

(87) PCT Pub. No.: WO2017/047477
PCT Pub. Date: Mar. 23, 2017

(65) Prior Publication Data
US 2018/0251084 A1    Sep. 6, 2018

(30) Foreign Application Priority Data
Sep. 14, 2015  (JP) .................................. 2015-181057

(51) Int. Cl.
*B60R 16/03* (2006.01)
*H02J 1/00* (2006.01)
(Continued)

(52) U.S. Cl.
CPC ................ *B60R 16/03* (2013.01); *H02J 1/00* (2013.01); *H02J 7/0031* (2013.01); *H04L 12/10* (2013.01);
(Continued)

(58) Field of Classification Search
CPC ........... B06R 16/03; H02J 1/00; H02J 7/0031; H04L 12/10; H04L 12/12;
(Continued)

(56) References Cited

U.S. PATENT DOCUMENTS

| 5,379,292 A | 1/1995 | Kurata et al. |
| 2012/0185718 A1* | 7/2012 | Miyoshi ................. G06F 1/266 713/323 |

(Continued)

FOREIGN PATENT DOCUMENTS

| JP | H02-028735 | 1/1990 |
| JP | H10-027009 A | 1/1998 |

(Continued)

OTHER PUBLICATIONS

Search Report for PCT/JP2016/076360, dated Nov. 22, 2016.

*Primary Examiner* — Duc C Ho
(74) *Attorney, Agent, or Firm* — Honigman LLP

(57) ABSTRACT

In a communication system, ECUs are connected to a bus. A relay apparatus receives data that was transmitted by one of the ECUs via the bus, and determines, based on the content of the reception, whether or not the power supply from a battery to a transmission source that transmitted the data is to be cut off. If the relay apparatus determines that the power supply to the transmission source is to be cut off, the relay apparatus cuts off the power supply from the battery to the transmission source.

12 Claims, 6 Drawing Sheets

(51) Int. Cl.
*H04L 12/12* (2006.01)
*H04L 12/40* (2006.01)
*H04L 12/841* (2013.01)
*H04L 29/08* (2006.01)
*H02J 7/00* (2006.01)
*H04L 12/10* (2006.01)

(52) U.S. Cl.
CPC ........ *H04L 12/12* (2013.01); *H04L 12/40039* (2013.01); *H04L 47/28* (2013.01); *H04L 67/12* (2013.01); *H04L 2012/40273* (2013.01)

(58) Field of Classification Search
CPC ... H04L 12/40039; H04L 47/28; H04L 67/12; H04L 2012/40273
See application file for complete search history.

(56) References Cited

U.S. PATENT DOCUMENTS

2012/0292988 A1* 11/2012 Nishida .................. B60R 16/03
307/10.1
2014/0334300 A1* 11/2014 Horihata ........... H04L 12/40039
370/230

FOREIGN PATENT DOCUMENTS

| JP | 2010-181212 A | 8/2010 |
|---|---|---|
| JP | 2012-242900 A | 12/2012 |
| JP | 2013-006455 A | 1/2013 |

* cited by examiner

Reception status table

| Time | Identification Code |
|------|---------------------|
| T1   | ID31                |
| T2   | ID41                |
| T3   | ID42                |
| ⋮    | ⋮                   |

Relay destination table

| Identification code | Bus to which data is to be output |
|---|---|
| ID30 | Bus 4 |
| ID31 | Bus 4 |
| ID40 | Bus 3 |
| ID42 | Bus 3 |

FIG. 4

Cutoff status table

| Identification code | Cutoff determination count | Threshold value |
|---|---|---|
| ID30 | C30 | Th30 |
| ID31 | C31 | Th31 |
| ID32 | C32 | Th32 |
| ID40 | C40 | Th40 |
| ID41 | C41 | Th41 |
| ID42 | C42 | Th42 |

FIG. 5

POWER SUPPLY CONTROL APPARATUS, COMMUNICATION SYSTEM, AND POWER SUPPLY CONTROL METHOD

CROSS-REFERENCE TO RELATED APPLICATIONS

This application is the U.S. national stage of PCT/JP2016/076360 filed Sep. 8, 2016 which claims priority of Japanese Patent Application No. JP 2015-181057 filed Sep. 14, 2015.

TECHNICAL FIELD

The present invention relates to a power supply control apparatus and a power supply control method for controlling the supply of power to a communication apparatus, and a communication system including the power supply control apparatus.

BACKGROUND

As the communication system installed in a vehicle, a communication system has been proposed in which a plurality of ECU (electronic control units) that control electric devices installed in a vehicle are connected to shared communication lines and communicate with each other (see JP 2009-105828A, for example). In this communication system, control processing for linking a plurality of electric devices is realized by communication between the plurality of ECUs.

In a conventional communication system as disclosed in JP 2009-105828A, if one of the ECUs goes out of control and repeatedly transmits data at short time intervals, this ECU may fully occupy a shared communication line. In this case, the other ECUs that are connected to this shared communication line cannot perform communication.

The present invention has been achieved in light of such issues and an object of the present invention is to provide a power supply control apparatus and a power supply control method according to which it is possible to prevent one communication apparatus (ECU) from occupying (monopolizing) a shared communication line, and to provide a communication system including the power supply control apparatus.

SUMMARY

A power supply control apparatus according to the present invention is a power supply control apparatus for controlling power supply to a plurality of communication apparatuses that are connected to a shared communication line, and repeatedly transmit data via the communication line the power supply control apparatus including a reception unit configured to receive data that was transmitted by one of the plurality of communication apparatuses via the communication line, a determination unit configured to determine, based on the content received by the reception unit, whether or not the power supply to a transmission source (source of transmission) that transmitted the data is to be cut off, and a cutoff unit configured to cut off the power supply to the transmission source if the determination unit determines that the power supply to the transmission source is to be cut off in which if an interval between times when the reception unit receives the data from the transmission source is less than a predetermined time period, the determination unit determines that the power supply to the transmission source is to be cut off.

The power supply control apparatus according to the present invention includes a counter configured to count, for each of the plurality of communication apparatuses, the number of instances of cutoff determination for which the determination unit has determined that the power supply is to be cut off, and a resumption unit configured to resume the power supply to the transmission source that was cut off by the cutoff unit if, after the cutoff unit has cut off the power supply, the number of instances of cutoff determination for the transmission source that was counted by the counter is less than a predetermined number.

The power supply control apparatus according to the present invention includes a selection unit configured to select, if the determination unit determines that the power supply to the transmission source is to be cut off, from communication apparatuses other than the transmission source, a communication apparatus to which the power supply is to be cut off, based on the content of the data received by the reception unit, in which if the determination unit determines that the power supply to the transmission source is to be cut off, the cutoff unit cuts off the power supply to the transmission source and the communication apparatus selected by the selection unit.

A communication system according to the present invention includes the above-described power supply control apparatus and the plurality of communication apparatuses.

A power supply control method according to the present invention is a power supply control method for controlling power supply to a plurality of communication apparatuses that are connected to a shared communication line, and repeatedly transmit data the method including receiving data transmitted by one of the plurality of communication apparatuses via the communication line, determining, based on the content of the received data, whether or not the power supply to the transmission source that transmitted the data is to be cut off, and cutting off the power supply to the transmission source if it is determined that the power supply to the transmission source is to be cut off, and in the determination whether or not the power supply is to be cut off, determining, if an interval between times when the data is received from the transmission source is less than a predetermined time period, that the power supply to the transmission source is to be cut off.

The power supply control apparatus according to the present invention is a power supply control apparatus for controlling power supply to a plurality of communication apparatuses connected to a shared communication line, the power supply control apparatus including a reception unit configured to receive data transmitted by one of the plurality of communication apparatuses via the communication line, a determination unit configured to determine, based on the content received by the reception unit, whether or not the power supply to a transmission source that transmitted the data is to be cut off, and a cutoff unit configured to cut off the power supply to the transmission source if the determination unit determines that the power supply to the transmission source is to be cut off. The transmission source to which the power supply is cut off by the cutoff unit is a communication apparatus that occupies the communication line.

The power supply control apparatus according to the present invention is a power supply control apparatus for controlling power supply to a plurality of communication apparatuses connected to a shared communication line, the power supply control apparatus including a reception unit configured to receive data transmitted by one of the plurality of communication apparatuses via the communication line, a determination unit configured to determine, based on a total amount of the data received by the reception unit over a certain time period, whether or not the power supply to a transmission source that transmitted the data is to be cut off, and a cutoff unit configured to cut off the power supply to the transmission source if the determination unit determines that the power supply to the transmission source is to be cut off.

The power supply control method according to the present invention is a power supply control method for controlling power supply to a plurality of communication apparatuses connected to a shared communication line, the method including receiving data transmitted by one of the plurality of communication apparatuses via the communication line, determining, based on the content of the received data, whether or not the power supply to the transmission source that transmitted the data is to be cut off, and cutting off the power supply to the transmission source if it is determined that the power supply to the transmission source is to be cut off. The transmission source to which the power supply is to be cut off is a communication apparatus that occupies the communication line.

The power supply control method according to the present invention is a power supply control method for controlling power supply to a plurality of communication apparatuses connected to a shared communication line, the method including receiving data transmitted by one of the plurality of communication apparatuses via the communication line, determining, based on a total amount of the data received over a certain time period, whether or not the power supply to the transmission source that transmitted the data is to be cut off, and cutting off the power supply to the transmission source if it is determined that the power supply to the transmission source is to be cut off.

In the power supply control apparatus and the power supply control method according to the present invention, the plurality of communication apparatuses are connected to a shared communication line. It is determined whether or not the power supply to the transmission source that transmitted data is to be cut off, based on the content of the received data that was transmitted by one of the plurality of communication apparatuses via the shared communication line. If it is determined that the power supply to the transmission source is to be cut off, the power supply to the transmission source is cut off. The plurality of communication apparatuses repeatedly transmit data via a communication line. If the interval between the times when the data is received from the transmission source is less than a predetermined time period, it is determined that the power supply to the transmission source is to be cut off, and the power supply is cut off.

For example, if one of the plurality of communication apparatuses goes out of control and transmits data via a shared communication line at short time intervals, the shared communication line is occupied by the communication apparatus that is out of control. In this manner, if one of the plurality of ECUs occupies a shared communication line, it is determined that the power supply to the transmission source that transmits the data is to be cut off, and the power supply to the transmission source is cut off. Accordingly, the operation of the communication apparatus that is out of control stops, preventing the one communication apparatus from occupying the shared communication line.

With the power supply control apparatus according to the present invention, the number of instances of cutoff determination in which it has been determined that the power supply to each of the plurality of communication apparatuses is to be cut off is counted. If the counted number of instances of cutoff determination for the transmission source is less than a predetermined number after the power supply to the transmission source is cut off, the power supply, which was cut off, to the transmission source is resumed.

If the cut off power supply is resumed, in general, the communication apparatus returns to an initial state. If the communication apparatus that is out of control returns to the initial state, there is a possibility that this communication apparatus will not go out of control. If the communication apparatus does not go out of control, the communication apparatus that went out of control normally operates, thus preventing a decrease in the functions realized by the plurality of communication apparatuses. The power supply, which was cut off, to the transmission source is repeatedly resumed until the number of instances of cutoff determination reaches a predetermined number.

With the power supply control apparatus according to the present invention, if it is determined that the power supply to the transmission source is to be cut off, an communication apparatus to which the power supply is to be cut off is selected from other communication apparatuses other than the transmission source, based on the content of data received from the transmission source. If it is determined that the power supply to the transmission source is to be cut off, the power supply not only to the transmission source but also to the selected communication apparatus is cut off.

If data transmitted by one communication apparatus is configured to be received by all of the communication apparatuses connected to the shared communication line, there is a possibility that another communication apparatus will react to the transmission of data from the communication apparatus that went out of control and erroneously operate. In the present invention, if it is determined that the power supply to the transmission source is to be cut off, a communication apparatus that reacts to the transmission of the data from the communication apparatus that went out of control and starts operation is selected based on the content of the data received from the transmission source, and the power supply to the selected communication apparatus is cut off. Accordingly, the transmission of the data from the transmission source makes it possible to prevent the selected communication apparatus from continuously operate erroneously.

In a communication system according to the present invention, a power supply control apparatus determines, based on the content of data received from one of the plurality of communication apparatuses via a shared communication line, whether or not power supply to a transmission source that transmitted the data is to be cut off. If it is determined that the power supply to the transmission source is to be cut off, power supply control apparatus cuts off the power supply to the transmission source.

In the power supply control apparatus and the power supply control method according to the present invention, the plurality of communication apparatuses are connected to a shared communication line. Based on the content of the received data transmitted by one of the plurality of communication apparatuses via the shared communication line, it is determined whether or not the power supply to the transmission source that transmitted the data is to be cut off. If it is determined that the power supply to the transmission source is to be cut off, the power supply to the transmission source is cut off. The transmission source to which the power supply is cut off is a communication apparatus that occupies the communication line.

For example, if one of the plurality of communication apparatuses goes out of control and transmits data via a shared communication line at short time intervals, the shared communication line is occupied by the communication apparatus that is out of control. In this manner, if one of the plurality of ECUs occupies a shared communication line, it is determined that the power supply to the transmission source that transmits the data is to be cut off, and the power supply to the transmission source is cut off. Accordingly, the operation of the communication apparatus that is out of control stops, preventing the one communication apparatus from occupying the shared communication line.

In the power supply control apparatus and the power supply control method according to the present invention, the plurality of communication apparatuses are connected to a shared communication line. Data transmitted by one of the plurality of communication apparatuses via the shared communication line is received. It is determined whether or not the power supply to the transmission source that transmitted data is to be cut off, based on the total amount of the data received over a certain time period. If it is determined that the power supply to the transmission source is to be cut off, the power supply to the transmission source is cut off.

According to the present invention, it is possible to prevent one communication apparatus from occupying a shared communication line.

BRIEF DESCRIPTION OF DRAWINGS

FIG. 4 is a diagram showing a relay destination table.

FIG. 5 is a diagram showing a cutoff status table.

DETAILED DESCRIPTION OF PREFERRED EMBODIMENTS

Hereinafter, the present invention will be described in detail with reference to the drawings showing embodiments.

Embodiment 1

Figure 1:
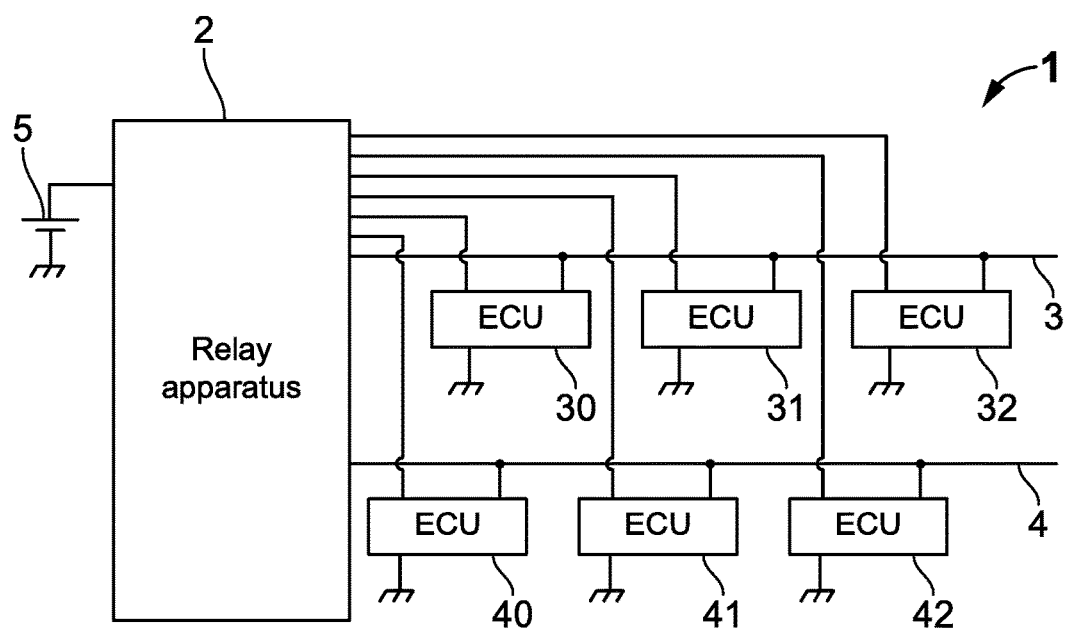
FIG. 1 is a block diagram showing the configuration of the main portions of a communication system according to Embodiment 1.

FIG. 1 is a block diagram showing the configuration of the main portions of a communication system 1 according to Embodiment 1. The communication system 1 is suitably installed in a vehicle, and includes a relay apparatus 2, buses 3 and 4, ECUs 30, 31, 32, 40, 41, and 42, and a battery 5. The buses 3 and 4 are communication lines constituted by twisted pair cables, for example. In FIG. 1, connection lines for power supply are represented by thick lines, and connection lines for communication with the buses 3 and 4 are represented by thin lines.

The relay apparatus 2 is connected to the buses 3 and 4, the ECUs 30, 31, 32, 40, 41, and 42, and the cathode of the battery 5. Furthermore, the ECUs 30, 31, and 32 are separately connected to the bus 3. Furthermore, the ECUs 40, 41, and 42 are separately connected to the bus 4. The anode of the battery 5 and the ECUs 30, 31, 32, 40, 41, and 42 are grounded.

Electric devices (not shown) installed in the vehicle are connected to the ECUs 30, 31, 32, 40, 41, and 42. The ECUs 30, 31, 32, 40, 41, and 42 respectively control the operations of the electric devices that are connected thereto.

Identification codes ID 30, ID 31, ID 32, ID 40, ID 41, and ID 42 are respectively allocated to the ECUs 30, 31, 32, 40, 41, and 42. The relay apparatus 2 and the ECUs 30, 31, and 32 communicate with each other via the bus 3. The relay apparatus 2 and the ECUs 40, 41, and 42 communicate with each other via the bus 4. Communication via the buses 3 and 4 is performed according to the CAN (controller area network) protocol or the CAN-FD (CAN with flexible data-rate) protocol.

The ECUs 30, 31, 32, 40, 41, and 42 function as communication apparatuses.

The ECU 30 transmits, via the bus 3, shared data including the identification code ID 30 to the other apparatuses connected to the bus 3, that is, the relay apparatus 2 and the ECUs 31 and 32. The ECU 30 is provided with a transmission storage area in which data to be transmitted via the bus 3 is stored. The ECU 30 generates data to be transmitted, based on the results output from a sensor connected to the ECU 30, and stores the generated data in the transmission storage area, for example.

If any data is stored in its transmission storage area, then the ECU 30 determines whether or not it is possible to transmit the data via the bus 3. If the data is currently being transmitted via the bus 3, then the ECU 30 determines that it is impossible to transmit the data. If no data is transmitted via the bus 3, then the ECU 30 determines that it is possible to transmit the data.

If the ECU 30 has determined that it is possible to transmit the data via the bus 3, the ECU 30 transmits the data to the relay apparatus 2 and the ECUs 31 and 32. When the transmission is complete, the ECU 30 deletes the data corresponding to the transmitted data, from the transmission storage area. If the ECU 30 has determined that it is impossible to transmit the data via the bus 3, the ECU 30 stops transmission of data until data can be transmitted via the bus 3.

The ECU 30 receives data from one of the relay apparatus 2 and the ECUs 31 and 32. The ECU 30 receives data including identification codes ID 31 and ID 32 respectively from the ECUs 31 and 32, and receives data including one of the identification codes ID 40, ID 41, and ID 42 from the relay apparatus 2.

The ECU 30 is provided with a reception storage area in which data that was received via the bus 3 is stored. Upon receiving data, the ECU 30 determines, based on the identification code included in the received data, whether or not the received data is to be stored in its reception storage area. If the ECU 30 determines that the received data is to be stored, the ECU 30 stores the received data in its reception storage area. The ECU 30 controls an electric device connected to the ECU 30, based on the data stored in the reception storage area. If the ECU 30 determines that the received data is not to be stored, the ECU 30 discards the received data.

Power is supplied from the battery 5 to the ECU 30 via the relay apparatus 2. If power is supplied from the battery 5, the ECU 30 operates, and if the power supply from the battery 5 is cut off, the ECU 30 stops operating.

The ECUs 31, 32, 40, 41, and 42 operate similarly to the ECU 30. The operation of the ECU 31 can be described by substituting the ECUs 30 and 31, and the identification codes ID 30 and ID 31 in the description of the operation of the ECU 30 respectively with the ECUs 31 and 30 and the identification codes ID 31 and ID 30. Similarly, the operation of the ECU 32 can be described by substituting the ECUs 30, 31, and 32 and the identification codes ID 30, ID 31, and ID 32 in the description of the operation of the ECU 30 respectively with the ECUs 32, 30, and 31 and the identification codes ID 32, ID 30, and ID 31.

The operation of the ECU 40 can be described by substituting the ECUs 30, 31, and 32, the identification codes ID 30, ID 31, ID 32, ID 40, ID 41, and ID 42, and the bus 3 in the description of the operation of the ECU 30 respectively with the ECUs 40, 41, and 42, the identification codes ID 40, ID 41, ID 42, ID 30, ID 31, and ID 32, and the bus 4.

Similarly, the operation of the ECU 41 can be described by substituting the ECUs 30, 31, and 32, the identification codes ID 30, ID 31, ID 32, ID 40, ID 41, and ID 42, and the bus 3 in the description of the operation of the ECU 30 respectively with the ECUs 41, 40, and 42, the identification codes ID 41, ID 40, ID 42, ID 30, ID 31, and ID 32, and the bus 4. The operation of the ECU 40 can be described by substituting the ECUs 30, 31, and 32, the identification codes ID 30, ID 31, ID 32, ID 40, ID 41, and ID 42, and the bus 3 in the description of the operation of the ECU 30 respectively with the ECUs 42, 40, and 41, the identification codes ID 42, ID 40, ID 41, ID 30, ID 31, and ID 32, and the bus 4.

The relay apparatus 2 relays data that is exchanged between at least one of the ECUs 30, 31, and 32 and at least one of the ECUs 40, 41, and 42.

Upon receiving the data from one of the ECUs 30, 31, and 32, the relay apparatus 2 determines, based on the identification code included in the received data, whether or not the received data is to be relayed. If the relay apparatus 2 determines that the received data is to be relayed, the relay apparatus 2 transmits the received data to the ECUs 40, 41, and 42 via the bus 4. If the relay apparatus 2 determines that the received data is not to be relayed, the relay apparatus 2 discards the received data.

Similarly, upon receiving the data from one of the ECUs 40, 41, and 42, the relay apparatus 2 determines, based on the identification code included in the received data, whether or not the received data is to be relayed. If the relay apparatus 2 determines that the received data is to be relayed, the relay apparatus 2 transmits the received data to the ECUs 30, 31, and 32 via the bus 3. If the relay apparatus 2 determines that the received data is not to be relayed, the relay apparatus 2 discards the received data.

The ECUs 30, 31, 32, 40, 41, and 42 communicate with each other according to the operation of the relay apparatus 2. Accordingly, various control processes for letting a plurality of the electric devices that are respectively connected to the ECUs 30, 31, 32, 40, 41, and 42 cooperate with each other are realized.

The relay apparatus 2 determines, based on the content received via the bus 3, whether or not the power supply from the battery 5 to the transmission source is to be cut off. If the relay apparatus 2 determines that the power supply to the transmission source is to be cut off, the relay apparatus 2 cuts off the power supply to the transmission source. Here, the transmission source is one of the ECUs 30, 31, and 32.

Similarly, the relay apparatus 2 determines, based on the content received via the bus 4, whether or not the power supply from the battery 5 to the transmission source is to be cut off. If the relay apparatus 2 determines that the power supply to the transmission source is to be cut off, the relay apparatus 2 cuts off the power supply to the transmission source. Here, the transmission source is one of the ECUs 40, 41, and 42.

As described above, the relay apparatus 2 functions as a power supply control apparatus for controlling the power supply from the battery 5 to the ECUs 30, 31, 32, 40, 41, and 42.

If the power supply to the ECUs 30, 31, 32, 40, 41, and 42 is successively cut off and resumed, they return to their initial state.

Figures 2, 3:
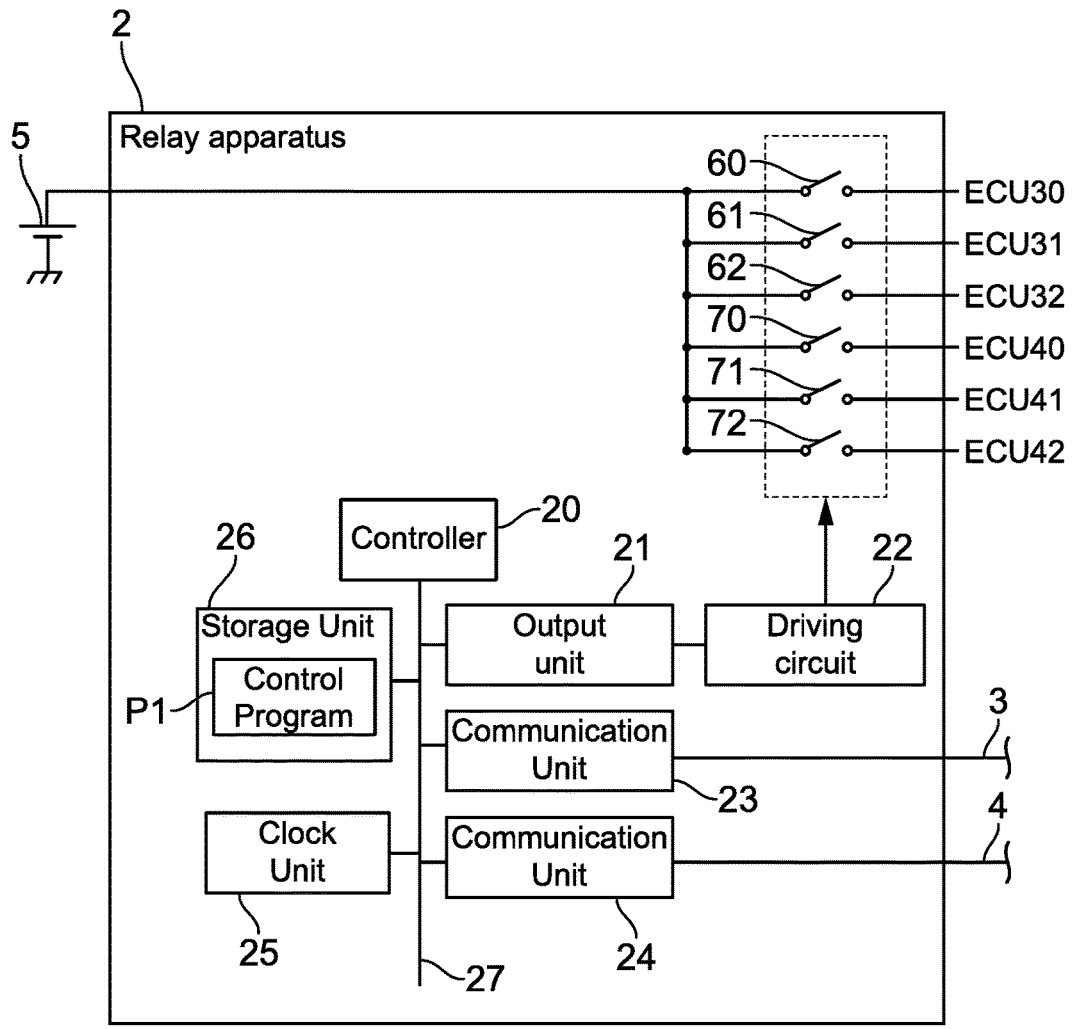
FIG. 2 is a block diagram showing the configuration of the main portions of a relay apparatus.
FIG. 3 is a diagram showing a reception status table.

FIG. 2 is a block diagram showing the configuration of the main portions of the relay apparatus 2. The relay apparatus 2 includes a controller 20, an output unit 21, a driving circuit 22, communication units 23 and 24, and a clock unit 25, a storage unit 26, and switches 60, 61, 62, 70, 71, and 72. In FIG. 2 as well, similarly to FIG. 1, connection lines for power supply are represented by thick lines, and connection lines for communication with the buses 3 and 4 are represented by thin lines.

The controller 20, the output unit 21, the communication units 23 and 24, the clock unit 25, and the storage unit 26 are separately connected to a bus 27. The output unit 21 is connected to the driving circuit 22. The communication units 23 and 24 are respectively connected to the buses 3 and 4. One end of each of the switches 60, 61, 62, 70, 71, and 72 is connected to the cathode of the battery 5. The other ends of the switches 60, 61, 62, 70, 71, and 72 are respectively connected to the ECUs 30, 31, 32, 40, 41, and 42.

The output unit 21 outputs a switch signal that indicates turning on or off of at least one of the switches 60, 61, 62, 70, 71, and 72, to the driving circuit 22 in accordance with the instruction received from the controller 20.

The switch signal is input to the driving circuit 22 from the output unit 21. The driving circuit 22 separately turns on or off the switches 60, 61, 62, 70, 71, and 72 in accordance with the content of the switch signal that was input by the output unit 21.

The switches 60, 61, 62, 70, 71, and 72 are semiconductor switches such as FETs (field effect transistors) or bipolar transistors. The switches 60, 61, 62, 70, 71, and 72 may also be relay contacts.

The switches 60, 61, 62, 70, 71, and 72 respectively correspond to the ECUs 30, 31, 32, 40, 41, and 42. If one of the switches 60, 61, 62, 70, 71, and 72 is turned off from the on state, the power supply from the battery 5 to the ECU corresponding to the switch that has been turned off is cut off, and this ECU stops operating. If one of the switches 60, 61, 62, 70, 71, and 72 is turned on from the off state, the power is supplied from the battery 5 to the ECU corresponding to the switch that has been turned on, and this ECU operates.

As described above, the identification codes ID 30, ID 31, ID 32, ID 40, ID 41, and ID 42 are respectively allocated to the ECUs 30, 31, 32, 40, 41, and 42. Therefore, the switches 60, 61, 62, 70, 71, and 72 also respectively correspond to the identification codes ID 30, ID 31, ID 32, ID 40, ID 41, and ID 42.

The communication unit 23 receives data transmitted from one of the ECUs 30, 31, and 32 via the bus 3. This data includes one of the identification codes ID 30, ID 31, and ID 32. The communication unit 23 provides the controller 20 with the data received via the bus 3. Also, the communication unit 23 transmits, to the ECUs 30, 31, and 32, data including one of the identification codes ID 40, ID 41, and ID 42 via the bus 3 in accordance with instructions received from the controller 20.

If the controller 20 instructs the communication unit 23 to transmit data, the communication unit 23 determines whether or not it is possible to transmit the data via the bus 3. If data is being transmitted via the bus 3, the communication unit 23 determines that it is impossible to transmit the data. If no data is transmitted via the bus 3, the communication unit 23 determines that it is possible to transmit the data.

If the communication unit 23 determines that it is possible to transmit data via the bus 3, the communication unit 23 transmits the data to the ECUs 30, 31, and 32. If the ECU 23 determines that it is impossible to transmit data via the bus 3, the communication unit 23 stops transmission of the data until data can be transmitted via the bus 3.

The communication unit 24 operates similarly to the communication unit 23. The operation of the communication unit 24 can be described by substituting the communication unit 23, the ECUs 30, 31, and 32, the bus 3, and the identification codes ID 30, ID 31, ID 32, ID 40, ID 41, and ID 42 in the description of the operation of the communication unit 23 with the communication unit 24, the ECUs 40, 41, and 42, the bus 4, and the identification codes ID 40, ID 41, ID 42, ID 30, ID 31, and ID 32.

The communication units 23 and 24 function as reception units.

The ECUs 30, 31, and 32 repeatedly transmit data to the communication unit 23 via the bus 3. The ECUs 40, 41, and 42 repeatedly transmit data to the communication unit 24 via the bus 4. An interval between the times when the ECUs 30, 31, 32, 40, 41, and 42 transmit data is set to be at least a reference time. Constant reference times for the ECUs 30, 31, 32, 40, 41, and 42 are stored in the storage unit 26 in advance.

The communication unit 23 of the relay apparatus 2 and the ECUs 30, 31, and 32 transmit data by successively outputting a plurality of bit values constituting data to the bus 3. The bit value represents one of the binary numbers "0" (dominant) and "1" (recessive). If the two bit values "0" and "1" are output to the bus 3 simultaneously, actually, the bit value "0" is output to the bus 3. The communication unit 23 of the relay apparatus 2 and the ECUs 30, 31, and 32 respectively monitor the bit values that are actually output to the bus 3 while the data is transmitted via the bus 3.

If the bit values that were output to the bus 3 and the bit values that are actually output to the bus 3 are different from each other, the communication unit 23 of the relay apparatus 2 and the ECUs 30, 31, and 32 respectively suspend the transmission of the data. If the transmission of the data has been suspended, the communication unit 23 notifies the controller 20 about the suspension. If the bit values that were output to the bus 3 match the bit values that are actually output to the bus 3, the communication unit 23 of the relay apparatus 2 and the ECUs 30, 31, and 32 respectively continue the transmission of the data. If the transmission of the data has been suspended, the communication unit 23 of the relay apparatus 2 and the ECUs 30, 31, and 32 respectively determine whether or not it is possible to transmit the data via the bus 3 again, and attempt to retransmit the data.

As described above, arbitration is performed among the communication unit 23 of the relay apparatus 2 and the ECUs 30, 31, and 32. Thus, even when at least two of the communication unit 23 of the relay apparatus 2 and the ECUs 30, 31, and 32 transmit data simultaneously, only one of the communication unit 23 of the relay apparatus 2 and the ECUs 30, 31, and 32 transmits data.

Arbitration that is similar to the arbitration performed among the communication unit 23 of the relay apparatus 2 and the ECUs 30, 31, and 32 is also performed between the communication unit 24 of the relay apparatus 2 and the ECUs 40, 41, and 42. Arbitration performed among the communication unit 24 of the relay apparatus 2 and the ECUs 40, 41, and 42 can be described by substituting the bus 3, the communication unit 23, and the ECUs 30, 31, and 32 in the description of arbitration performed between the communication unit 23 of the relay apparatus 2 and the ECUs 30, 31, and 32 with the bus 4, the communication unit 24, and the ECUs 40, 41, and 42.

The controller 20 reads out time information indicating the day, year, and time from the clock unit 25. The time information read out from the clock unit 25 indicates the day, year, and time at a time point at which the time information is read out.

The storage unit 26 is a non-volatile memory. A reception status table indicating the status of reception by the communication units 23 and 24, a relay destination table indicating a relay destination (i.e. the location where data is relayed to), and a cutoff status table indicating the status of the cutoff of the power supply to the ECUs 30, 31, 32, 40, 41, and 42 are stored in the storage unit 26. The controller 20 reads out the content from the reception status table, relay destination table, and cutoff status table. Furthermore, content is added to the reception status table by the controller 20, and the content of the cutoff status table is modified by the controller 20.

FIG. 3 is a diagram showing the reception status table. In the reception status table, the time at which the communication units 23 and 24 received data is associated with the identification code included in the data received by the communication units 23 and 24. In FIG. 3, T1, T2, and T3 indicate times. For example, the reception status table shown in FIG. 3 shows that the communication unit 31 has received the data including the identification code ID 31 at the time T1.

As described above, the data including the identification code ID 31 is transmitted by the ECU 31. Thus, the communication unit 31 receiving the data including the identification code ID 31 at the time T1 means that the ECU 31 has transmitted data to the communication unit 31 at the time T1. In other words, the reception status table lists the transmission source that transmitted the data to the relay apparatus 2, and the time at which the transmission source transmitted the data.

Relationships correlating time and identification code are added to the reception status table by the controller 20 every time the communication units 23 and 24 receive any data.

FIG. 4 is a diagram showing the relay destination table. The identification code included in the data to be relayed and the bus to which this data is to be output are listed in the relay destination table. If the identification code included in the data received by the communication units 23 and 24 is one of the identification codes ID 30, ID 31, ID 40, and ID 42, the data received by the communication unit 23 or 24 is relayed.

The data including either the identification code ID 30 or ID 31 is output to the bus 4. That is, the communication unit 24 transmits this data to the ECUs 40, 41, and 42. Also, the data including either the identification code ID 40 or ID 41 is output to the bus 3. That is, the communication unit 23 transmits this data to the ECUs 30, 31, and 32.

If the identification code included in the data received by the communication units 23 and 24 is one of the identification codes ID 32 and ID 41, the data received by the communication unit 23 or 24 is discarded.

FIG. 5 is a diagram showing the cutoff status table. The cutoff status table lists the number of instances of cutoff determination (the cutoff determination count) for which it has been determined that the power supply is to be cut off, and threshold values for the cutoff determination counts in association with the identification codes ID 30, ID 31, ID 32, ID 40, ID 41, and ID 42, that is, the ECUs 30, 31, 32, 40, 41, and 42.

C30, C31, C32, C40, C41, and C42 respectively represent the cutoff determination counts for the ECUs 30, 31, 32, 41, 42, and 43, and correspond to the identification codes ID 30, ID 31, ID 32, ID 40, ID 41, and ID 42. The cutoff determination counts C30, C31, C32, C40, C41, and C42 are modified by the controller 20.

Th30, Th31, Th32, Th40, Th41, and Th42 respectively represent the threshold values of the cutoff determination counts C30, C31, C32, C40, C41, and C42, and respectively correspond to the identification codes ID 30, ID 31, ID 32, ID 40, ID 41, and ID 42. Th30, Th31, Th32, Th40, Th41, and Th42 are natural numbers and are set in advance.

The storage unit 26 shown in FIG. 2 is provided with a transmission area in which data to be transmitted by the communication units 23 or 24 is stored. Data is stored over time in the transmission area of the storage unit 26. The controller 20 reads out data from the transmission area of the storage unit 26, adds data to the transmission area, and deletes data from the transmission area.

Also, a control program P1 is stored in the storage unit 26. The controller 20 has a CPU (central processing unit, which is not shown). The CPU of the controller 20 performs first additional processing for adding data received by the communication unit 23 to the transmission area of the storage unit 26, second additional processing for adding data received by the communication unit 24 to the transmission area of the storage unit 26, and transmission processing for causing the communication units 23 or 24 to transmit data, by executing the control program P1 stored in the storage unit 26. The first additional processing includes power supply control processing for controlling the power supply from the battery 5 to the ECUs 30, 31, and 32. The second additional processing includes power supply control processing for controlling the power supply from the battery 5 to the ECUs 40, 41, and 42.

Figure 6:
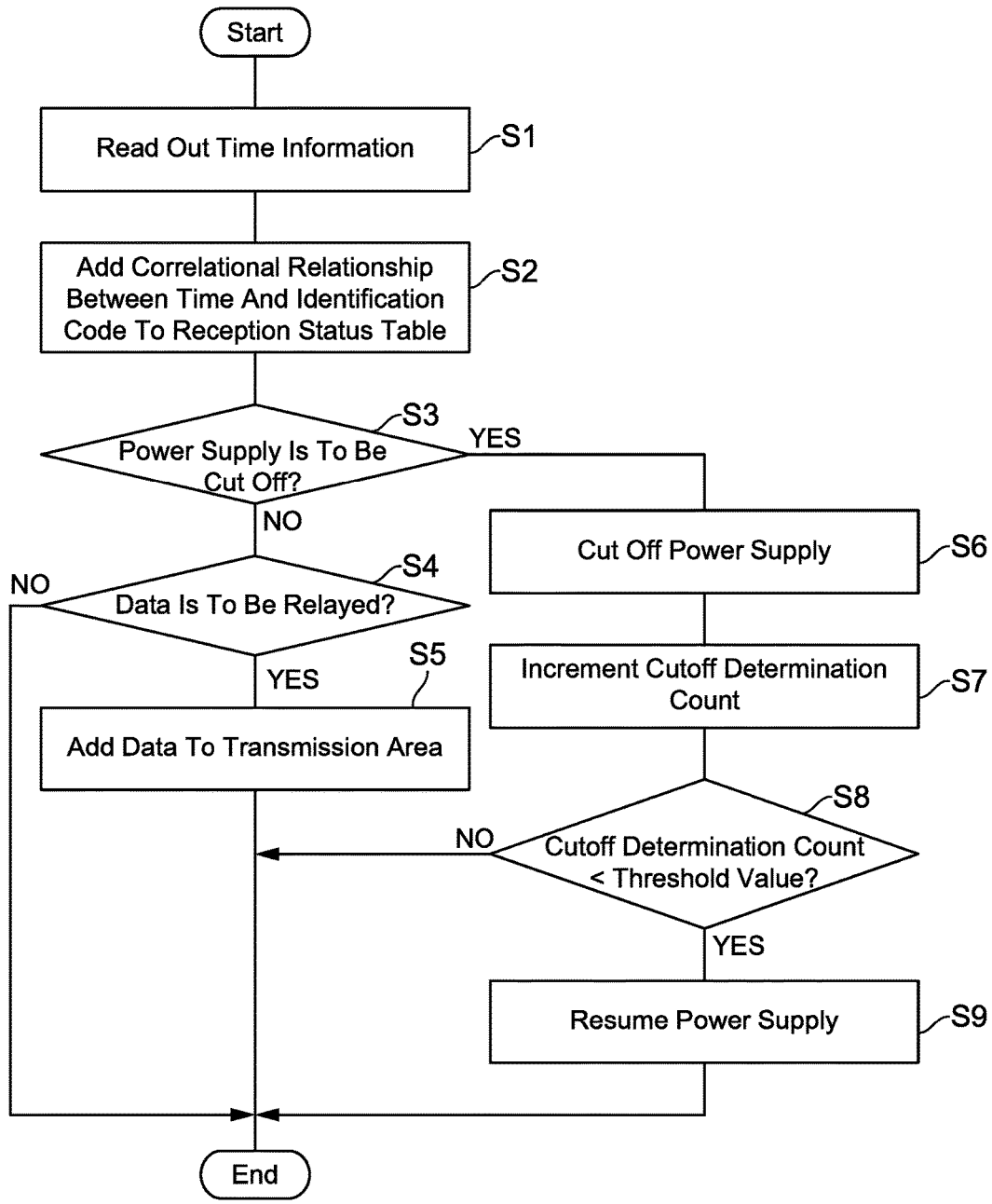
FIG. 6 is a flowchart showing a procedure of first additional processing executed by a controller.

FIG. 6 is a flowchart showing a procedure of first additional processing executed by the controller 20. The controller 20 executes the first additional processing every time the communication unit 23 receives data from one of the ECUs 30, 31, and 32.

First, the controller 20 reads out the time information from the clock unit 25 (step S1). Next, the controller 20 adds, to the reception status table of the storage unit 26, a relationship correlating the time shown in the time information that was read out in step S1 and the identification code included in the data received by the communication unit 23 (step S2). Because the first additional processing is executed every time the communication unit 23 receives data, the reception status table lists the past reception status.

Next, the controller 20 determines, based on the content of the reception status table, that is, the content received by the communication unit 23, whether or not the power supply to the transmission source that transmitted data to the communication unit 23 is to be cut off (step S3). Herein, if the interval between the times when the communication unit 23 received data from the transmission source, specifically, the time interval between the time when the communication unit 23 last received data from the transmission source and the time when the communication unit 23 previously received data from the transmission source is less than the reference time, the controller 20 determines that the power supply to the transmission source is to be cut off. If the interval between the times when the communication unit 23 received data from the transmission source reaches the reference time, the controller 20 determines that the power supply to the transmission source is not to be cut off. The controller 20 functions as the determination unit.

For example, if the communication unit 23 receives data including the identification code ID 30, the controller 20 calculates, based on the content of the reception status table, the interval between the time when the communication unit 23 last received data including the identification code ID 30 and the time when the communication unit 23 previously received data including the identification code ID 30. If the calculated time interval is less than the reference time corresponding to the transmission source, that is, the ECU 30, the controller 20 determines that the power supply to the ECU 30 is to be cut off, and if the calculated time interval reaches the reference time corresponding to the ECU 30, the controller 20 determines that the power supply to the ECU 30 is not to be cut off.

Note that the time interval used in the determination in step S3 is not limited to the time interval between two times, and may also be an average value of a plurality of intervals between the times when the communication unit 23 receives data from the same transmission source over a certain time period, for example.

If the controller 20 determines that the power supply to the transmission source is not to be cut off (step S3: NO), the controller 20 determines, based on the content of the relay destination table in the storage unit 26, whether or not the data received by the communication unit 23 is to be relayed (step S4). Herein, if the identification code included in the data received by the communication unit 23 is listed in the relay destination table, the controller 20 determines that the data is to be relayed. If the identification code included in the data received by the communication unit 23 is not listed in the relay destination table, the controller 20 determines that the data is not to be relayed.

The relay destination table shown in FIG. 4 lists the identification codes ID 30, ID 31, ID 40, and ID 42. Thus, if the identification code included in the data received by the communication unit 23 is the identification code ID 30, then the controller 20 determines that the data is to be relayed. If the identification code included in the data received by the communication unit 23 is the identification code ID 32, then the controller 20 determines that the data is not to be relayed.

If the controller 20 determines that the data is to be relayed (step S4: YES), the controller 20 adds the data received by the communication unit 23 to the transmission area of the storage unit 26 (step S5). The data added to the transmission area is transmitted by the communication unit 24.

If the controller 20 determines that the data is not to be relayed (step S4: NO) or after executing step S5, the controller 20 ends the first additional processing. If the controller 20 determines that the data is not to be relayed and ends the first additional processing, the controller 20 discards the data received by the communication unit 23.

If the communication unit 23 receives data from one of the ECUs 30, 31, and 32 after the controller 20 ends the first additional processing, the controller 20 executes the first additional processing again.

If the controller 20 determines that the power supply to the transmission source is to be cut off (step S3: YES), the controller 20 cuts off the power supply to the transmission source (step S6). Specifically, the controller 20 instructs the output unit 21 to output, to the driving circuit 22, a switch signal to turn off that one of the switches 60, 61, 62, 70, 71, and 72 corresponding to the identification code included in the data received by the communication unit 23. Accordingly, the driving circuit 22 turns off the switch corresponding to the identification code included in the data received by the communication unit 23, and cuts off the power supply from the battery 5 to the transmission source. At this time, the ECU 30, 31 or 32 that was the transmission source stops operating. The controller 20 also functions as the cutoff unit.

For example, in step S6 if the data received by the communication unit 23 includes the identification code ID 32, the controller 20 instructs the output unit 21 to output, to the driving circuit 22, a switch signal to turn off the switch 62 corresponding to the identification code ID 32. The driving circuit 22 turns off the switch 62, and cuts off the power supply from the battery 5 to the transmission source, that is, the ECU 32.

After executing step S6, the controller 20 increments the cutoff determination count corresponding to the transmission source by one in the cutoff status table (step S7). For example, in step S7 executed if the identification code included in the data received by the communication unit 23 is the identification code ID 32, the controller 20 increments the identification code ID 32, that is, the cutoff determination count C32 corresponding to the ECU 32 by one.

As described above, the controller 20 executes the first additional processing every time the communication unit 23 receives data from one of the ECUs 30, 31, and 32. Moreover, if the controller 20 determines that the power supply to the transmission source is to be cut off, the controller 20 increments the cutoff determination count for the transmission source by one.

In this manner, the controller 20 counts the cutoff determination count for the ECUs 30, 31, and 32. The controller 20 also functions as the counter.

Next, the controller 20 determines, based on the content of the cutoff status table in the storage unit 26, whether or not the cutoff determination count corresponding to the transmission source is less than a threshold value corresponding to the transmission source (step S8). For example, in step S8, if the identification code included in the data received by the communication unit 23 is the identification code ID 32, the controller 20 determines whether or not the cutoff determination count C32 is less than the threshold value Th32.

If the controller 20 determines that the cutoff determination count is less than the threshold value (step S8: YES), the controller 20 resumes the power supply to the transmission source that was cut off in step S6 (step S9). Specifically, the controller 20 instructs the output unit 21 to output, to the driving circuit 22, a switch signal to turn on that one of the switches 60, 61, 62, 70, 71, and 72 corresponding to the identification code included in the data received by the communication unit 23. Accordingly, the driving circuit 22 turns on the switch corresponding to the identification code included in the data received by the communication unit 23, and resumes the power supply to the transmission source from the battery 5. At this time, the ECU 30, 31 or 32 that was the transmission source returns to the initial state. The controller 20 thus also functions as the resumption unit.

If the controller 20 determines that the cutoff determination count reaches a threshold value (step S8: NO) or after executing step S9, the controller 20 ends the first additional processing. If the communication unit 23 receives data from one of the ECUs 30, 31, and 32 after the controller 20 ends the first additional processing, the controller 20 executes the first additional processing again.

If the controller 20 determines that the cutoff determination count for the transmission source reaches the threshold value and ends the first additional processing, the controller 20 keeps the power supply to the transmission source cut off and does not resume the operation of the ECU that was the transmission source. Thus, after the first additional processing is ended, the communication unit 23 does not receive data from any ECU to which the power supply has been cut off.

The controller 20 executes the second additional processing similarly to the first additional processing, every time the communication unit 24 receives data from one of the ECUs 40, 41, and 42. The second additional processing can be described by respectively changing the communication units 23 and 24, the ECUs 30, 31, and 32, the identification codes ID 30 and ID 32, the cutoff determination count C32, and the threshold value Th32 in the description of the first additional processing (except for the description of step S4, which uses the relay destination table shown in FIG. 4) to the communication units 24 and 23, the ECUs 40, 41, and 42, and the identification codes ID 40 and ID 42, the cutoff determination count C42, and the threshold value Th42.

As described above, the relay destination table shown in FIG. 4 lists the identification codes ID 30, ID 31, ID 40, and ID 42. Therefore, in step S4 of the second additional processing, if the identification code included in the data received by the communication unit 24 is the identification code ID 40, the controller 20 determines that data is to be relayed. If the identification code included in the data received by the communication unit 24 is the identification code ID 41, the controller 20 determines that no data is to be relayed.

Figure 7:
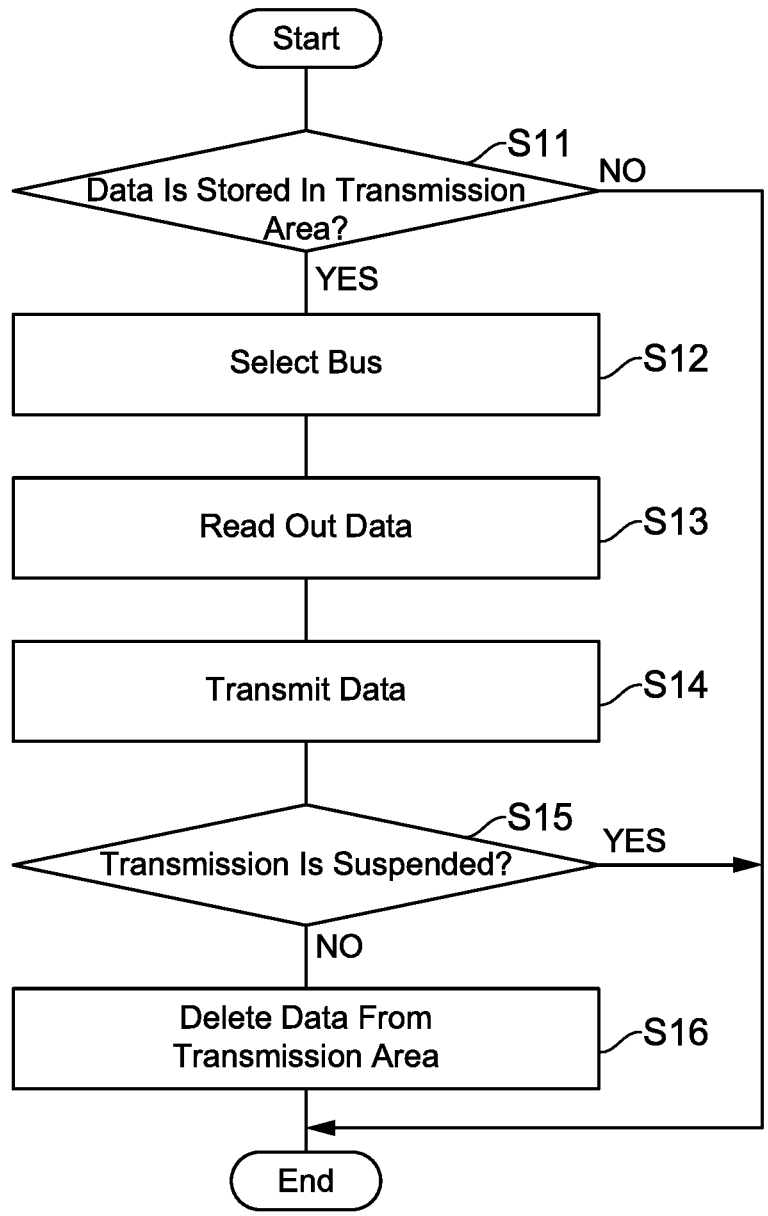
FIG. 7 is a flowchart showing a procedure of transmission processing executed by the controller.

FIG. 7 is a flowchart showing a procedure of transmission processing executed by the controller 20. The controller 20 cyclically executes the transmission processing.

The controller 20 determines whether or not data is stored in the transmission area of the storage unit 26 (step S11). If the controller 20 determines that data is stored in the transmission area (step S11: YES), the controller 20 selects, from the buses 3 and 4, based on the content of the relay destination table, a bus to which the data that was first stored in the transmission area is to be output (step S12).

For example, if the identification code included in the data stored in the transmission area that was stored first is the identification code ID 31, the controller 20 selects the bus 4 in step S12.

Next, the controller 20 reads out, from the transmission area, the data that was first stored in the transmission area (step S13), and instructs the communication unit corresponding to the bus selected in step S12 to transmit the readout data (step S14). If the bus selected in step S12 is the bus 3, then, in step S14, the controller 20 instructs the communication unit 23 to transmit the data that was read out in step S13 to the ECUs 30, 31, and 32. If the bus selected in step S12 is the bus 4, then, in step S14, the controller 20 instructs the communication unit 24 to transmit the data that was read out in step S14 to the ECUs 40, 41, and 42.

Next, the controller 20 determines whether or not data transmission performed by the communication unit 23 or 24 has been suspended (step S15). If the communication unit 23 or 24 notifies the controller 20 of the suspension of the transmission for a predetermined time period sufficient for the communication unit 23 or 24 to transmit the data, then, the controller 20 determines that the transmission has been suspended. And if the communication unit 23 or 24 does not notify the controller 20 of the suspension of the transmission for the above-described predetermined time period, the controller 20 determines that the transmission has not been suspended.

If the controller 20 determines that the transmission has not been suspended (step S15: NO), the controller 20 deletes the first stored data from the data stored in the transmission area (step S16).

If the controller 20 determines that no data is stored in the transmission area (step S11: NO), determines that the transmission has been suspended (step S15: YES), or after executing step S16, the controller 20 ends the transmission processing. Thereafter, the controller 20 resumes the transmission processing when the next period comes.

If the controller 20 determines that data transmission has been suspended and ends the transmission processing, step S16 has not been executed yet, and thus the suspended data transmission is executed again in the next transmission processing.

If one of the ECUs 30, 31, and 32 goes out of control and transmits data via the bus 3 at short time intervals, the bus 3 is occupied by the ECU that is out of control. In the first additional processing, if one of the ECUs 30, 31, and 32 occupies the bus 3 in this manner, the controller 20 determines that power supply to a transmission source that transmits the data, that is, the ECU that is out of control is to be cut off, and cuts off the power supply to the transmission source. Accordingly, the operation of the ECU that is out of control stops, preventing one of the ECUs 30, 31, and 32 from occupying the bus 3.

Also, if the intervals between times when data is received from the transmission source are less than the reference time, the controller 20 determines that the power supply to the transmission source is to be cut off, and cuts off the power supply. Thus, for example, if one of the ECUs 30, 31, and 32 goes out of control and transmits data via the bus 3 at short time intervals, the operation of this ECU can be stopped.

Furthermore, in the first additional processing, if the controller 20 determines that power supply to the transmission source is to be cut off and the counted cutoff determination count for the transmission source is less than a threshold value, the controller 20 resumes, in step S9, the power supply to the transmission source that was cut off in step S6. If the cut off power supply is resumed, as described above, the ECUs 30, 31, 32, 40, 41, and 42 respectively return to their initial state. As described above, there is a possibility that the ECU that was out of control will not go out of control again due to the resumption of the power supply. If the ECU does not go out of control again, the ECU that was out of control operates normally, thus preventing a decrease in the functions realized by the ECUs 30, 31, and 32. The controller 20 repeats resumption of the cut off power supply until the cutoff determination count for each of the ECUs 30, 31, and 32 reaches the threshold value.

If one of the ECUs 30, 31, and 32 is out of control due to tampering with the control program, the ECU that is out of control may go out of control again even after it returns to the initial state. In this case, the cutoff determination count corresponding to the ECU that is out of control rapidly increases and reaches the threshold value. If the cutoff determination count reaches the threshold value, the cut off power supply to this ECU will not be resumed.

As described above, the controller 20 executes the second additional processing similarly to the first additional processing. Thus, the controller 20 executing the second additional processing makes it possible to prevent one of the ECUs 40, 41, and 42 from occupying the bus 4. Also, for example, if one of the ECUs 40, 41, and 42 goes out of control and transmits data via the bus 4 at short time intervals, the operation of this ECU can be stopped. Furthermore, the controller 20 executing the second additional processing makes it possible to prevent a decrease in the functions realized by the ECUs 40, 41, and 42.

Embodiment 2

In Embodiment 1, if one of the ECUs 30, 31, and 32 or one of the ECUs 40, 41, and 42 goes out of control and transmits data at short time intervals, the controller 20 cuts off power supply only to the transmission source in the first additional processing or the second additional processing. However, the object to which the power supply is cut off is not limited to the transmission source, and the controller 20 may also cut off power supply to a plurality of ECUs including the transmission source.

Hereinafter, Embodiment 2 will be described about differences from Embodiment 1. Other configurations other than the later-described configurations are similar to those in Embodiment 1, and thus are given similar reference numerals and their redundant description will be omitted.

Embodiment 2 differs from Embodiment 1 in the first additional processing and the second additional processing executed by the controller 20 of the relay apparatus 2.

Figure 8:
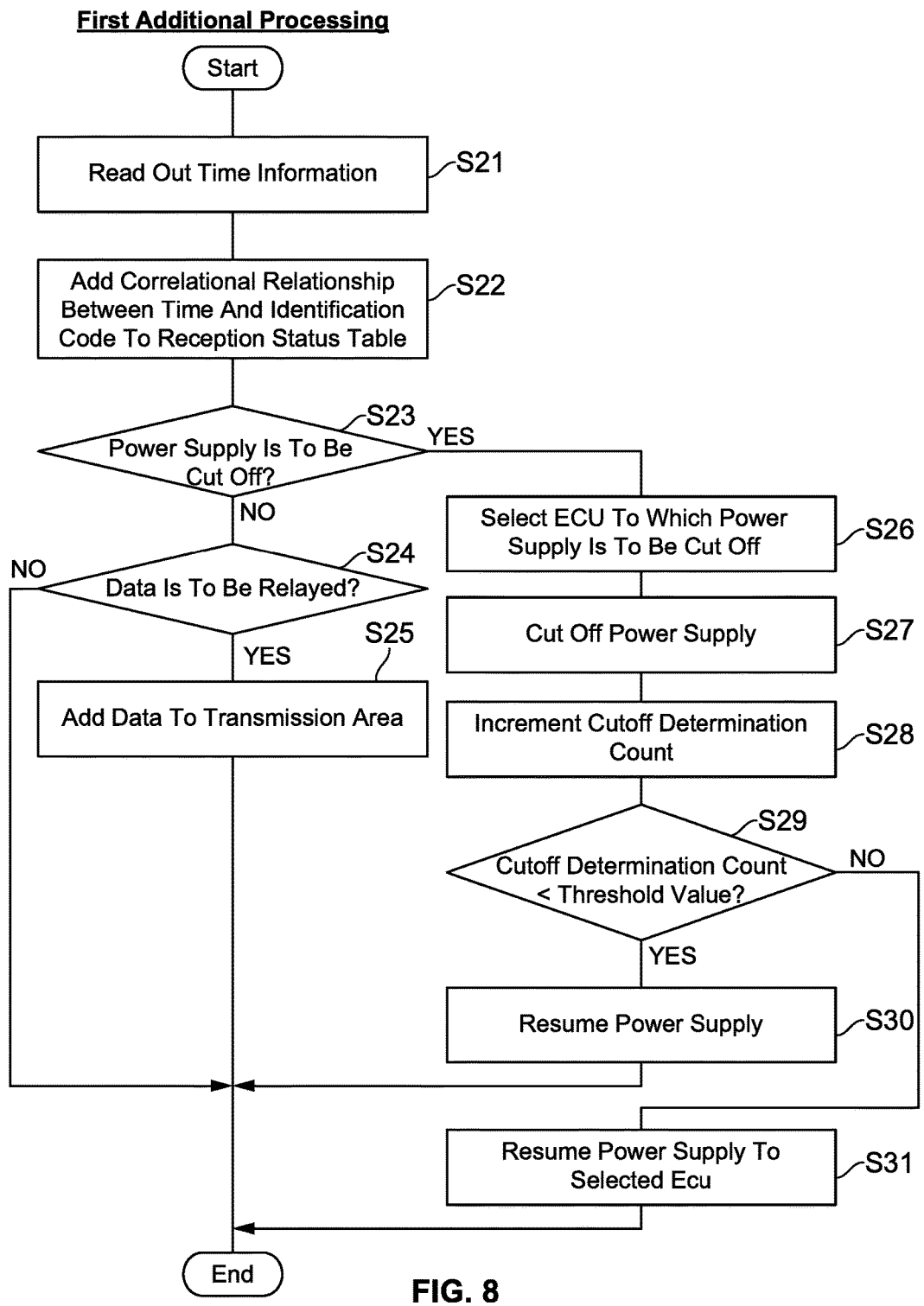
FIG. 8 is a flowchart showing a procedure of first additional processing executed by a controller in Embodiment 2.

FIG. 8 is a flowchart showing a procedure of the first additional processing executed by the controller 20 in Embodiment 2. Similarly to Embodiment 1, the controller 20 executes the first additional processing every time the communication unit 23 receives data from one of the ECUs 30, 31, and 32. Steps S21 to S25 executed by the controller 20 in the first additional processing in Embodiment 2 are respectively similar to steps S1 to S5 executed by the controller 20 in the second additional processing in Embodiment 1. Thus, a detailed description of steps S21 to S25 will be omitted.

If the controller 20 determines that the power supply to the transmission source is to be cut off (step S23: YES), the controller 20 selects, based on the content of the data received by the communication unit 23, one or more ECUs to which the power supply is to be cut off from the ECUs apart from the transmission source (step S26). As described in Embodiment 1, the data transmitted by any of the ECUs 30, 31, and 32 is received not only by the communication unit 23 but also by the other two ECUs. Thus, for example, if the identification code included in the data received by the communication unit 23 is the identification code ID 30 and the ECU 31 corresponding to the identification code ID 31 is expected to start operation based on the content of the data received by the communication unit 23, the controller 20 selects the ECU 31 as the ECU to which the power supply is to be cut off. The controller 20 functions as the selection unit.

Next, the controller 20 cuts off the power supply to the transmission source, and to the one or more ECUs selected in step S26 (step S27). Specifically, the controller 20 instructs the output unit 21 to output, to the driving circuit 22, a switch signal to turn off that one of the switches 60, 61, 62, 70, 71, and 72 that corresponds to the identification code included in the data received by the communication unit 23 and a switch or switches corresponding to the one or more ECUs selected in step S26. Accordingly, the driving circuit 22 turns off the switch corresponding to the transmission source and the switch or switches corresponding to the one or more ECUs selected in step S26. Accordingly, the ECU that was the transmission source and the one or more ECUs selected in step S26 stop operation.

For example, if the data received by the communication unit 23 includes the identification code ID 30 and the ECU 31 is selected in step S26, the controller 20 causes the driving circuit 22 to output a switch signal to turn off the switches 60 and 61 respectively corresponding to the identification code ID 30 and the ECU 31. The driving circuit 22 turns off the switches 60 and 61, and cuts off the power supply from the battery 5 to the ECUs 30 and 31.

In the first additional processing in Embodiment 2, the controller 20 executes step S27, and thus transmission of the data from the transmission source makes it possible to prevent the one or more ECUs selected in step S26 from continuing erroneous operation.

After executing step S27, similarly to step S7 in the first additional processing in Embodiment 1, the controller 20 increments the cutoff determination count for the transmission source that is shown in the cutoff status table by one (step S28). The controller 20 counts the cutoff determination count for the ECUs 30, 31, and 32 by executing step S28.

Next, similarly to step S8 in the first additional processing in Embodiment 1, the controller 20 determines, based on the content of the cutoff status table in the storage unit 26, whether or not the cutoff determination count for the transmission source is less than a threshold value (step S29). If the controller 20 determines that the cutoff determination count for the transmission source is less than the threshold value (step S29: YES), the controller 20 resumes the power supply to the transmission source and the one or more ECUs to which the power supply was cut off in step S27 (step S30).

Specifically, the controller 20 instructs the output unit 21 to output, to the driving circuit 22, a switch signal to turn on that one of the switches 60, 61, 62, 70, 71, and 72 corresponding to the identification code included in the data received by the communication unit 23 and a switch or switches corresponding to the one or more ECUs selected in step S26.

Accordingly, the driving circuit 22 turns on the switch corresponding to the transmission source and the switch or the switches corresponding to the one or more ECUs selected in step S26, and resumes the power supply from the battery 5 to the transmission source, and the one or more ECUs selected in step S26. At this time, the ECU 30, 31 or 32 that was the transmission source and the one or more ECUs selected in step S26 return to their initial states. Accordingly, there is a possibility that the operation of the ECU that was the transmission source will return to be normal. Also, the one or more ECUs selected in step S26 start operation in the normal state.

If the controller 20 determines that the cutoff determination count for the transmission source reaches the threshold value (step S29: NO), the controller 21 resumes the power supply to the one or more ECUs selected in step S26 (step S31). Specifically, the controller 20 instructs the output unit 21 to output, to the driving circuit 22, a switch signal to turn on the switch or switches 60, 61, 62, 70, 71 and/or 72 corresponding to the one or more ECUs selected in step S26.

Accordingly, the driving circuit 22 turns on the switch or switches corresponding to the one or more ECUs selected in step S26, and resumes the power supply from the battery 5 to the one or more ECUs selected in step S26. At this time, the ECUs 30, 31, and/or 32 selected in step S26 return to the initial states. Accordingly, the one or more ECUs selected in step S26 start operation in the normal state.

The controller 20 ends the first additional processing after executing steps S30 and S31. If the communication unit 23 receives data from one of the ECUs 30, 31, and 32 after the controller 20 ends the first additional processing, the controller 20 executes the first additional processing again.

If the controller 20 executes step S31 and ends the first additional processing, the controller 20 keeps the power supply to the transmission source cut off and does not resume the operation of the ECU that was the transmission source. Thus, after the first additional processing is ended, no data is transmitted from any ECU to which the power supply has been cut off.

The controller 20 executes the second additional processing in Embodiment 2 similarly to the first additional processing in Embodiment 2, every time the communication unit 24 receives data from one of the ECUs 40, 41, and 42. The second additional processing in Embodiment 2 can be described by respectively changing the first additional processing, the communication unit 23, the ECUs 30, 31, and 32, the switches 60, 61, 62, 70, 71, and 72, and the identification codes ID 30 and ID 31 in the description of the first additional processing in Embodiment 2 to the second additional processing, the communication unit 24, the ECUs 40, 41, and 42, the switches 70, 71, 72, 60, 61, and 62, and the identification codes ID 40 and ID 41.

In the first additional processing and the second additional processing in Embodiment 2, the power supply to the transmission source is cut off and resumed similarly to Embodiment 1. Thus, the relay apparatus 2 in Embodiment 2 exhibits effects similar to those of Embodiment 1.

Note that in the first additional processing and the second additional processing in Embodiments 1 and 2, the determination whether or not the power supply to the transmission source that transmitted the data is to be cut off is not limited to the determination based on the intervals between the times when the communication unit 23 or 24 receives data from the transmission source. For example, if the communication unit 23 or 24 receives data, the controller 20 stores the identification code and the amount of received data in association with the time. The controller 20 may also determine whether or not the power supply to the transmission source is to be cut off, based on the total amount of data received from the transmission source over a certain time period.

The number of ECUs connected to the buses 3 and 4 is not limited to three, and may also be two, four, or more. Also, the number of ECUs connected to the bus 3 is different from the number of ECUs connected to the bus 4. Furthermore, the number of buses connected to the relay apparatus 2 is not limited to two, and may also be at least three. In this case, two or more ECUs are connected to each of the buses connected to the relay apparatus 2, and similarly to Embodiment 1 or 2, the relay apparatus 2 relays data exchanged among a plurality of ECUs connected to different buses, and separately controls the power supply to the plurality of ECUs connected to the buses.

The power supply control apparatus for controlling the power supply to the plurality of ECUs connected to the buses is not necessarily the relay apparatus 2. A power supply control apparatus having a power supply control function of the relay apparatus 2 may also be connected to each bus. For example, in Embodiment 1, the power supply control apparatus may also be connected to the bus 3 separately from the relay apparatus 2. In this case, the power supply control apparatus receives data from one of the ECUs 30, 31, and 32, and determines, based on the content of the reception, whether or not the power supply to the transmission source is to be cut off. If it is determined that the power supply to the transmission source is to be cut off, the power supply control apparatus cuts off the power supply to the transmission source.

Embodiments 1 and 2 that were disclosed are to be considered exemplary in all respects and in no way limiting. The scope of the present invention is defined by the scope of the appended claims and not by the above description, and all changes that fall within the same essential spirit as the scope of the claims are included therein.

The invention claimed is:

1. A power supply control apparatus for controlling power supply to a plurality of communication apparatuses that are connected to a shared communication line and repeatedly transmit data via the communication line, the power supply control apparatus comprising:
   a reception unit configured to receive data transmitted by one of the plurality of communication apparatuses via the communication line;
   a determination unit configured to determine, based on a content received by the reception unit, whether or not the power supply to a transmission source that transmitted the data is to be cut off; and
   a cutoff unit configured to cut off the power supply to the transmission source if the determination unit determines that the power supply to the transmission source is to be cut off,
   wherein if an interval between times at which the reception unit receives the data from the transmission source is less than a predetermined time period, the determination unit determines that the power supply to the transmission source is to be cut off.

2. The power supply control apparatus according to claim 1, comprising:
   a counter configured to count, for each of the plurality of communication apparatuses, the number of instances of cutoff determination for which the determination unit has determined that the power supply is to be cut off; and
   a resumption unit configured to resume the power supply to the transmission source that was cut off by the cutoff unit if, after the cutoff unit has cut off the power supply, the number of instances of cutoff determination for the transmission source that was counted by the counter is less than a predetermined number.

3. The power supply control apparatus according to claim 1, comprising:
   a selection unit configured to select, if the determination unit determines that the power supply to the transmission source is to be cut off, from communication apparatuses other than the transmission source, a communication apparatus to which the power supply is to be cut off, based on a content of the data received by the reception unit,
   wherein if the determination unit determines that the power supply to the transmission source is to be cut off, the cutoff unit cuts off the power supply to the transmission source and the communication apparatus selected by the selection unit.

4. The power supply control apparatus according to claim 2, comprising:
   a selection unit configured to select, if the determination unit determines that the power supply to the transmission source is to be cut off, from communication apparatuses other than the transmission source, a communication apparatus to which the power supply is to be cut off, based on the content of the data received by the reception unit,
   wherein if the determination unit determines that the power supply to the transmission source is to be cut off, the cutoff unit cuts off the power supply to the transmission source and the communication apparatus selected by the selection unit.

5. A communication system comprising:
   the power supply control apparatus according to claim 1; and
   the plurality of communication apparatuses.

6. A power supply control method for controlling power supply to a plurality of communication apparatuses that are connected to a shared communication line and repeatedly transmit data, the method comprising:
   receiving data transmitted by one of the plurality of communication apparatuses via the communication line;
   determining, based on a content of the received data, whether or not the power supply to the transmission source that transmitted the data is to be cut off;
   cutting off the power supply to the transmission source if it is determined that the power supply to the transmission source is to be cut off; and
   in the determination whether or not the power supply is to be cut off, determining, if an interval between times when the data is received from the transmission source is less than a predetermined time period, that the power supply to the transmission source is to be cut off.

7. A power supply control apparatus for controlling power supply to a plurality of communication apparatuses connected to a shared communication line, the power supply control apparatus comprising:
   a reception unit configured to receive data transmitted by one of the plurality of communication apparatuses via the communication line;
   a determination unit configured to determine, based on a content received by the reception unit, whether or not the power supply to a transmission source that transmitted the data is to be cut off; and
   a cutoff unit configured to cut off the power supply to the transmission source if the determination unit determines that the power supply to the transmission source is to be cut off,
   wherein the transmission source to which the power supply is cut off by the cutoff unit is a communication apparatus that occupies the communication line.

8. A power supply control apparatus for controlling power supply to a plurality of communication apparatuses connected to a shared communication line, the power supply control apparatus comprising:
   a reception unit configured to receive data transmitted by one of the plurality of communication apparatuses via the communication line;
   a determination unit configured to determine, based on a total amount of the data received by the reception unit over a certain time period, whether or not the power supply to a transmission source that transmitted the data is to be cut off; and
   a cutoff unit configured to cut off the power supply to the transmission source if the determination unit determines that the power supply to the transmission source is to be cut off.

9. A power supply control method for controlling power supply to a plurality of communication apparatuses connected to a shared communication line, the method comprising:
   receiving data transmitted by one of the plurality of communication apparatuses via the communication line;

determining, based on a content of the received data, whether or not the power supply to the transmission source that transmitted the data is to be cut off; and cutting off the power supply to the transmission source if it is determined that the power supply to the transmission source is to be cut off, wherein the transmission source to which the power supply is to be cut off is a communication apparatus that occupies the communication line.

10. A power supply control method for controlling power supply to a plurality of communication apparatuses connected to a shared communication line, the method comprising:

receiving data transmitted by one of the plurality of communication apparatuses via the communication line;

determining, based on a total amount of the data received over a certain time period, whether or not the power supply to the transmission source that transmitted the data is to be cut off; and cutting off the power supply to the transmission source if it is determined that the power supply to the transmission source is to be cut off.

11. A communication system comprising:
the power supply control apparatus according to claim 2; and
the plurality of communication apparatuses.

12. A communication system comprising:
the power supply control apparatus according to claim 3; and
the plurality of communication apparatuses.

\* \* \* \* \*